DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 8, 1970

878 O.G. 239

T878,005
PHOTOGRAPHIC DIFFUSION TRANSFER PRODUCT AND PROCESS

Timothy F. Parsons, Hilton, N.Y.
(Kodak Park, Rochester, N.Y. 14650)

Filed Jan. 14, 1970, Ser. No. 2,932
Int. Cl. G03c *1/48*
U.S. Cl. 96—29
No Drawing. 15 Pages Specification

A substantially protein free receiving layer for use in a photographic diffusion transfer process comprises silver precipitants and a colloid binder comprising from about 50 to about 95% by weight polyvinyl alcohol based on the total binder and from about 5 to about 50% by weight of a neutral polymer such as a polymer of about 50 to about 95% by weight of at least one butyl acrylate with from about 5 to about 50% by weight of an ethylenically unsaturated polymerizable monomer other than butyl acrylate. Useful polymers include hydrosols comprising poly(n-butylacrylate-styrene-methacrylamide), poly(n-butylacrylate-acrylonitrile), poly(n - butylacrylate - acrylic acid), etc. The layer can also contain toning or processing compounds. This layer is typically carried on a support and is used in a diffusion transfer process to provide a photographic print having an image in the receiving layer on the support.